A. H. HARRIS.
TIRE MAKING MACHINE.
APPLICATION FILED MAR. 24, 1915.
1,160,075.
Patented Nov. 9, 1915.
3 SHEETS—SHEET 3.
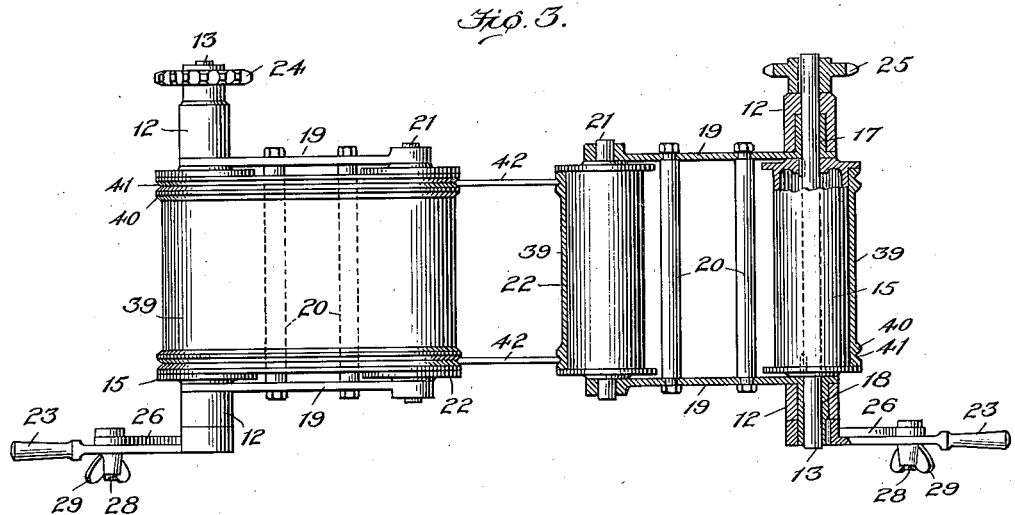
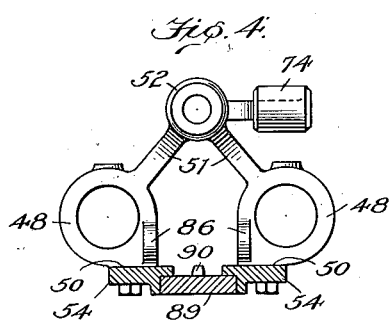
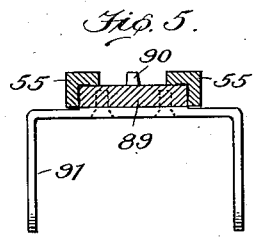
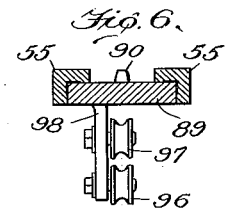
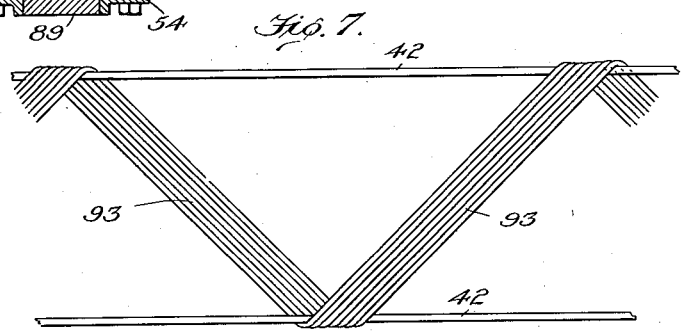
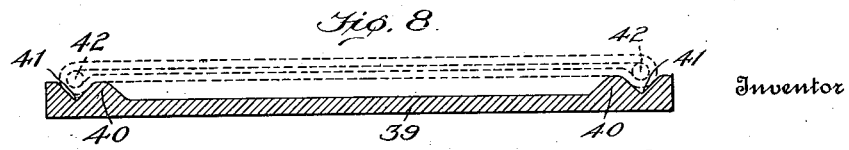

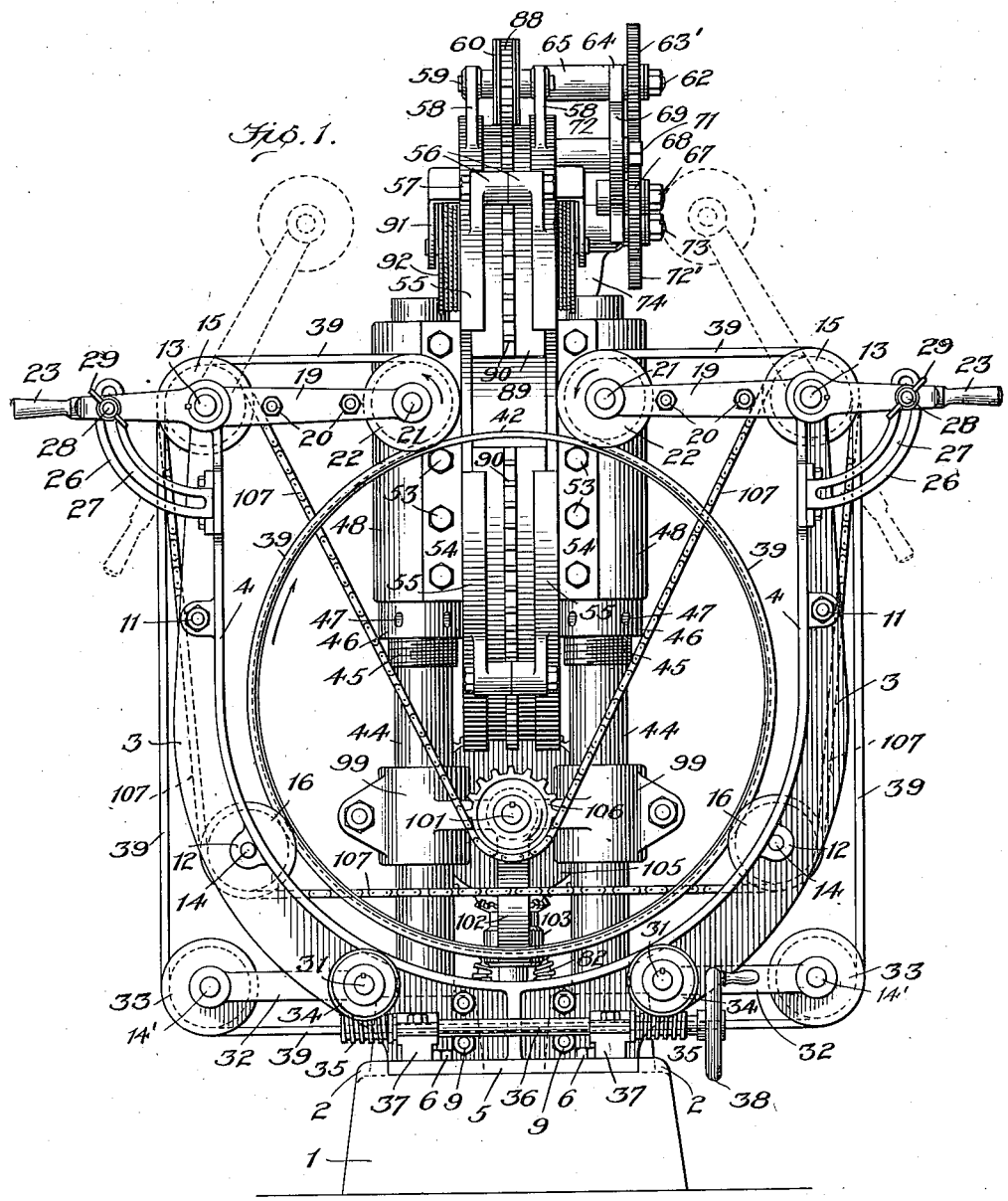

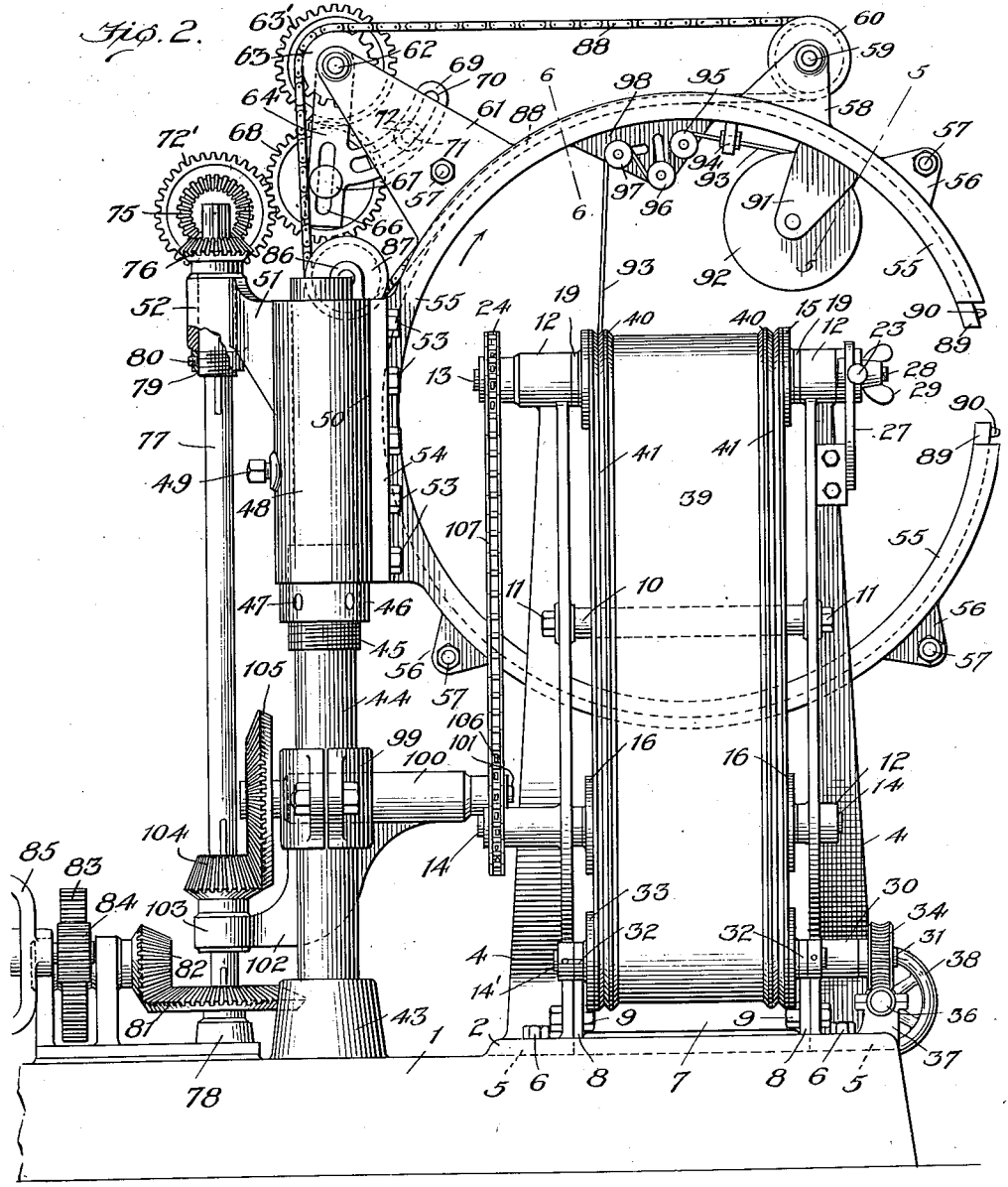

UNITED STATES PATENT OFFICE.

ARCHER H. HARRIS, OF YOUNGSTOWN, OHIO.

TIRE-MAKING MACHINE.

1,160,075.  Specification of Letters Patent.  Patented Nov. 9, 1915.

Application filed March 24, 1915. Serial No. 16,577.

*To all whom it may concern:*

Be it known that I, ARCHER H. HARRIS, a citizen of the United States, residing at Youngstown, in the county of Mahoning and State of Ohio, have invented certain new and useful Improvements in Tire-Making Machines; and I do hereby declare the following to be a full, clear, and exact description of the invention, such as will enable others skilled in the art to which it appertains to make and use the same.

My invention relates to tire making machines, but more especially to machines for producing the body material or fabricated portions of a tire carcass. Generally stated, it comprises a wrapping machine, designed, arranged and adapted primarily for making the body material of cord-wound tire shoes or casings, as distinguished from shoes or casings employing frictioned fabric cut on the bias and stretched into form. This same machine, however, without material alteration, may be employed in building tire carcasses by winding strips of rubberized or frictioned-fabric transversely and circumferentially about a suitable ring-core; or it may be employed to similarly wrap with a strip of suitable fabric, a tire carcass constructed in whole or in part of rubber, or compositions containing rubber, for purposes of maintaining the article in shape during vulcanization by the open cure process. And moreover, the present machine may be utilized in the preparation of finished tires for shipment, by wrapping them transversely and circumferentially with paper strips in the well-known manner. In its primary use, however, my present invention is devoted to the production of a body material for tire carcasses of the cord or thread wound type. It is a well recognized fact that tires of the class mentioned are superior in some respects to those employing frictioned fabric as the body material; and particularly when, as is usually the case, such fabric is cut on the bias to facilitate stretching, and as a consequence is weakened, at the very place where the greatest strength is desirable, namely, at its sides where blow-outs usually occur. It is also an acknowledged fact that cord or thread wound tires are more speedy than those employing a body-material of woven fabric, other conditions being equal, and are more efficient in that they afford greater mileage per charge in the case of electric vehicles, or per gallon of gasolene in the case of gas cars; they are also more resilient and consequently more comfortable riding.

My present invention therefore, has for an object the ultimate production of cord wound tires of the class described, and the production of automatic machines for forming the material of which the body portion, or carcass, of said cord wound tires are formed.

As a further object this invention contemplates and provides for the economical and expeditious manufacture of such tires.

A further object resides in means for systematically and uniformly applying the cord or thread elements of a body material for tires in two or more plies, and with uniform density throughout the carcass.

A further object is the production of means whereby bead reinforcing members may be machine-wound as above mentioned, to become an integral part of the tire structure.

A further object is the production of an organized machine of novel construction for accomplishing the results above indicated, and it will be understood that the several moving parts thereof, driven from a common source of power, are properly timed and synchronized.

With these and other objects in view the invention will now be particularly described, and pointed out by the claims following.

In the accompanying drawings which form part of this application for Letters Patent, and whereon like numerals of reference indicate corresponding parts in the several views: Figure 1 is a front elevation of the invention showing a pair of annular bead-reinforcing members in position and ready for winding. Fig. 2 is a side elevation of parts illustrated by Fig. 1, showing the driving mechanism for all rotary parts. Fig. 3 is a detached detail view, partly in plan and partly in horizontal section, showing a pair of feed rolls, and a pair of guiding rolls for a combined work holder and driving belt. Fig. 4 is a plan view of a double support for a shuttle housing, showing also the shuttle and its raceway in horizontal section. Figs. 5 and 6 are both detail sectional views through the shuttle and shuttle housing, taken at 5—5 and 6—6 respectively, on Fig. 2. Fig. 7 is a plan view of a pair of parallel bead reinforcing members, or steel rings, having wound thereon, a few turns only of rubberized cord, and, Fig. 8 is a relatively enlarged sectional view taken transversely through the work holding and driving belt, a pair of bead reinforcing rings connected by two plies of cord being indicated in dotted lines.

Reference being had to the drawings and numerals thereon, 1 indicates a machine base or pedestal made of cast iron, or of reinforced concrete, or other suitable material, and flanged as at 2 upon both sides at its forward end. From between these parallel flanges rises a work holding or supporting frame comprising a duplicate pair of U-shaped castings 3 each having an integral angular stiffening flange 4, and at its bottom a horizontal flange or foot 5 through which the respective frame members are securely bolted in an upright position to pedestal 1 as at 6, 6. At this point also there is introduced between the oppositely disposed U-shaped frame members 3, 3 a spreader or space block 7 having flanged ends 8, 8, bolted to said members 3, 3, as at 9. As a means of spacing the upper portions of said frame members 3, 3 and maintaining them in fixed relation, there is provided tubular spacing bars 10, 10 secured in place by tie rods or bolts 11, 11 passing through corresponding sides of the oppositely disposed frame members 3, 3 and there secured by ordinary threaded nuts and washers as shown by Figs. 1 and 2.

At both upper ends of each U-shaped frame member 3, and also at intermediate and corresponding positions upon each, as best shown by Fig. 1 of the drawings, are cast integral enlargements or perforated bosses 12 which serve as journal bearings for upper cross shafts 13 and lower cross shafts 14 upon which shafts are mounted upper and lower flanged guide rollers 15, 15 and 16, 16, respectively, of a length substantially corresponding with the distance between the frame members 3, 3. As best shown by Fig. 3 the said upper shafts 13, 13 are keyed to their respective rollers 15, 15, and are extended at both ends thereof. Mounted directly upon each of these shafts 13 and within the oppositely disposed bearings 12, 12 of frame members 3, 3, are outwardly extending tubular journals 17 and 18 of a vertically movable roller-frame 19, the sides of which frame are maintained in parallel and fixed relation by agency of interposed tubular space members and connecting bolts 20, 20 as shown. In the outer ends of both frames 19 are mounted roller shafts 21, and to these are keyed guide rollers 22, similar to the aforesaid rollers 15; while to the end of each tubular bearing 18 is keyed a hand lever 23 by means of which its particular frame 19, and consequently its guide roller 22, may be rocked upon its shaft 13 as a center. Upon the rearward end of the said extended shafts 13 are keyed driven sprocket wheels 24 and 25 for purposes which will later appear.

To the front of flange 4 near the upper end of each main frame member 3 are bolted outward and upwardly extending arms 26 each provided with an arcuate slot 27 within which travels the shank of a binding screw 28 provided with a wing-nut 29 as the means of locking the hand levers 23, and consequently guide roller 22, in predetermined positions.

Through the base of both frame members 3, upon opposite sides of their centers, and in suitable bearings such as 30, are mounted horizontally arranged rock shafts 31, to which are rigidly secured the links 32; while between each pair of said links at their outer ends are pivotally mounted combined tension and guide rollers 33. Upon the forwardly projecting end of both rock shafts 31 is securely keyed a worm wheel 34, while in mesh with these latter are right and left worms 35, carried by a shaft 36 mounted in bearings 37 and provided at one end with an operating wheel 38, as best shown by Fig. 1, thus constituting tensioning mechanism for a belt 39. This belt 39 is endless, it is also flexible, and of a width corresponding substantially with the distance between flanges of its guide rollers 15, 16, 22 and 33, and is formed of any suitable material such as rubber or balata and fabric. Upon its working face the said belt is thickened at its opposite sides as at 40, 40, and is provided with edge grooves throughout its entire length as shown at 41, 41, for the purpose of receiving and retaining in operative position bead reinforcing members, or steel rings, such as shown at 42 in Figs. 1, 3 and 7, and by dotted lines in Fig. 8, for purposes which will later appear in connection with a statement of operation.

Immediately back of the work supporting and advancing mechanism hereinbefore described, and upon pedestal 1, is located the driving mechanism which will now be described.

Rising from the surface of pedestal 1 are bosses 43, 43 into which are secured, preferably by screw-threaded connections, the lower ends of two duplicate and parallel columns or upright standards 44, 44, each provided with a screw-threaded collar or enlargement 45 at its approximate center, and a nut 46 in threaded relation therewith, the latter being perforated as at 47 for the reception of a wrench pin or lever (not shown) whereby the said nuts may be raised or lowered. Mounted upon the said standards 44, immediately above their respective nuts 46, is a vertically movable double support 48 for a shuttle housing, said support comprising a pair of substantially cylindrical barrels each pierced by a clamping bolt 49 bearing at its inner end upon its particular standard 44, and at its opposite or front side each having a vertical plane face 50. These cylindrical members of the said support 48 are connected at their upper ends by converging webs 51 which terminate in a vertical journal box and bearing 52 for a main driving shaft which will later be described in connection with the actuating or operating mechanism.

Securely bolted as at 53 to the plane faces 50 of the said double support 48 are lateral flanges 54 of a two-part shuttle-support or raceway 55. This feature of invention is made of corresponding half sections, which are circular in form and are provided with a gap or opening at their front, they are also angular in cross section, thus providing inwardly extending shuttle-retaining side flanges, and are spaced apart at their inner edges by agency of integral inwardly extending and abutting lugs 56 securely bolted together as shown at 57 by Figs. 1 and 2 of the drawings. Extending radially from the peripheries of both members, or halves, of said shuttle raceway 55, are additional lugs 58, in which are journaled a stub shaft 59 bearing an idler pulley or sheave 60, as shown by Figs. 1 and 2; and to the rear of said lugs 58 in like manner is located another pair of longer lugs 61, also properly spaced apart and connected by a bolt 57. At the outer ends of the last mentioned parallel lugs 61 is journaled a shaft 62 upon which is keyed a driving sprocket wheel 63 in alinement with the sheave 60 aforesaid, while upon the laterally extended end of said shaft 62 is similarly keyed a gear wheel 63', adjacent to which upon the same shaft 62 is pivotally suspended a link 64. This link 64 is offset from the innermost lug 61 by means of a sleeve 65 which surrounds the shaft 62, and at its lower end is provided with a longitudinal slot 66 in which, upon a suitable bolt 67, is adjustably journaled an intermediate driven gear 68 meshing with the aforesaid gear 63'. Projecting forwardly from the said link 64 is an arm 69 broken by an arcuate slot 70, through which latter the said link and depending parts may be locked in adjusted positions by agency of a through bolt 71, and a spacing sleeve 72, interposed between arms 69 of said link and the innermost of the lugs 61.

In mesh with the intermediate gear just described is another gear 72' carried by and keyed to a stub shaft 73 which finds a horizontal journal bearing in a bracket 74 rising from journal box 52. To the opposite end of said stub shaft 73 is affixed a driven bevel gear 75 constantly in mesh with a horizontal driving bevel gear 76 splined upon a main driving shaft 77, and rotatively stepped at its lower end in a boss 78 cast or otherwise formed upon pedestal 1. Thus it will be seen that the journal box 52, its integral bracket 74, and all depending parts are vertically adjustable upon the drive shaft 77, and to assist in retaining the same in adjusted positions a collar 79 is provided surrounding said shaft, and also a set screw 80 bearing thereon.

Near its lower end drive shaft 77 is provided with a horizontally arranged beveled gear 81 also splined thereon, this in turn being driven by a spur gear 82, a driven gear 83 carried by a back-shaft to which said gear 82 is affixed, and a driving pinion 84 upon the shaft of an electric motor 85, or a prime mover of any other description.

Midway of the two cylindrical members of the shuttle housing support 48 at their upper extremities are cast an integral pair of lugs 86 between which is rotatively mounted a guide sheave 87 in alinement with the corresponding sheave 60 and the driving sprocket wheel 63 aforesaid, while over the latter and over both of said guide sheaves runs an endless sprocket chain 88.

Within the shuttle-housing or raceway 55 is a rotary circular shuttle or bobbin-carrier 89, having a work-admitting gap at one point in its circumference, and provided upon the center of its exterior surface with a circumferential series of sprocket teeth 90, said teeth being adapted and arranged to travel in a plane coincident with the space between the two sections or spaced apart members of the shuttle-housing 55. Upon the inner periphery of said shuttle 89 is provided a pair of lugs 91 between which is pivotally and detachably mounted a flanged bobbin or reel 92 carrying a supply of working cord, thread, or wrapping material 93, which latter by preference passes through an eye 94, also carried by the shuttle, and over tension rolls 95, 96 and 97. The said rolls are pivotally supported by a fin 98 depending from the shuttle 89, the last two of said rolls being mounted in elongated bearings and therefore movable radially and circumferentially to somewhat increase the tension as the cord or wrapping material 93 is drawn off and utilized.

In addition to the driving mechanism heretofore described, including endless chain 88 for rotating shuttle 89 rapidly in the direction indicated by an arrow in Fig. 2, there is provided mechanism for rotating the steel bead rings or bead reinforcing members 42, 42 in the direction indicated by the arrow in Fig. 1, at an angle to the line of travel of shuttle 89, and in linked relation thereto, as will now be described.

Adjustably secured to both vertical columns 44, 44 is a double yoked saddle-clip 99 having a centrally arranged horizontal bearing 100 for a driven shaft 101, and also a depending bracket 102 passing centrally between said columns and provided with a bearing 103 for the main drive shaft 77. Immediately above this bearing 103 and splined upon said shaft 77 is a beveled driving pinion 104 in mesh with a beveled driven gear 105 keyed to one end of the shaft 101 at the opposite end whereof is affixed a driving sprocket 106 as best shown by Fig. 1.

Over the last named sprocket runs an endless sprocket chain 107 which passes thence upward in diverging lines over driven sprockets 24 and 25 on the rearwardly extended ends of upper shafts 13, 13, and thence over idler sprockets similarly situated upon the rearwardly extending ends of lower shafts 14, 14, and 14', 14' by means of which the belt rollers 15, 16, 22 and 33 are positively driven.

This being a description of my present invention its use and operation may be briefly stated as follows: Belt rollers 22, 22 having been temporarily elevated by agency of hand levers 23, 23, as indicated in dotted lines by Fig. 1, a pair of steel bead rings such as 42, 42 are next introduced, as shown by said figure, into the continuous side grooves 41, 41 of the endless belt 39 which thus supports the said bead reinforcing members in operative working position. Driven now by agency of the chain 107 and operative connections, the said belt 39 serves to rotate said reinforcing members or bead rings in the direction indicated by the arrow in Fig. 1. A bobbin 92 carrying a supply of rubber saturated or rubberized cord 93 having been journaled in the brackets 91 as shown by Figs. 1 and 2, may now be rotated more or less rapidly according to requirements, together with its attached shuttle 89, the latter being driven in the direction indicated by the arrow in Fig. 2 through agency of the endless sprocket chain 88 in constant engagement with a portion of the peripheral shuttle teeth 90, and coöperating with the gear train and intermediate connections heretofore described with the source of power. As a preliminary step, the end of cord 93 is first led from bobbin 92 over the tension rolls 95, 96 and 97 to one bead ring 42. The driving mechanism then being started it will be seen that shuttle 89 and the parallel bead rings 42, 42 will be rapidly rotated both in a clockwise direction, at varying speeds, and in interlinked relation or orbital paths, the cord 93 being thus wound in closely adjacent loops over and around both rings 42 as indicated by Fig. 7 of the drawings, until the entire space is covered by adjacent parallel strands collectively forming a hollow flat tube or wicklike two-ply annular body-material for tires reinforced at its edges by within-contained annular bead rings. Obviously, a repetition of the said winding process once again around rings 42 will produce a four-ply body material built upon the same bead rings, and so on to any desired number of superimposed plies or layers of cord, and it is evident that the angle of applying said cords may be varied in the different plies by varying the relative speed of the rotating shuttle 89 and bead rings 42. This variance may be accomplished in different ways, the one illustrated being that of substituting gears of different diameters for the gears 68 and 63' shown, and changing the center of rotation of the former accordingly by agency of the adjustable supporting link 64 and its arcuate slotted securing arm 69 to insure the proper intermeshing of either larger or smaller gears 68 and 63'. Thus it will be apparent that the angle at which cords 93 are applied to bead rings 42, 42 may be variously changed according to the relative speed of travel of the said rotary members. It will be noted also that the direction of winding the cords 93 upon bead rings 42, 42, may be reversed by the mere reversal of the direction of travel of the work-supporting belt 39, and this obviously may be accomplished by any of the well known reversing means, so common to driving mechanisms similar to that herein shown and described. It will be observed also that the present structure makes provision for bead rings 42 of somewhat increased diameters, inasmuch as elevation of the guide rollers 22, 22 will permit the introduction of such, within certain limits, to the work-holding portion or inner loop of the endless belt 39. If rings 42 of increased diameter are to be wound as aforesaid, it becomes desirable, although not necessary, to raise accordingly the center of rotation of shuttle 89, and this may readily be accomplished by elevating the entire shuttle housing or raceway 55, which is secured to and moves with the vertically adjustable double support 48, the latter being conveniently elevated by means of screw collars 46 and suitable wrench pins. It will also be noted that an adjustment is provided for the driving sprocket 106, carried by the vertically movable clip 99 and its connections, and when so adjusted one way or the other, the proper intermeshing of driven gear 105 and the driving gear 104 is insured by corresponding adjustment of the latter in its splined seat upon the main driving shaft 77.

Although cord has been referred to mainly, throughout the foregoing specification, it should be understood that any suitable form of rubberized thread or wrapping material may be employed in practice without departing from the spirit of the present invention, and although a single bobbin 92 has been shown and described, a plurality of such bobbins may readily be employed at one and the same time. Moreover it is, of course, understood that the various moving parts hereinbefore set forth as an exemplification of the present invention, are properly timed and synchronized in actual construction so as to insure proper winding of the cord 93, and the best results at all times.

The foregoing being a description of my invention in the best form of construction at present known to me, it should be noted that various mechanical and structural changes may be made without materially altering the principle of operation or results accomplished, and to all such I lay claim the same as if hereinbefore set forth.

Having thus described my invention what I now claim and desire to secure by Letters Patent is:

1. In a machine for forming the body material of elastic tires, the combination with flexible means for operatively supporting and advancing bead-reinforcing members, of a bobbin adapted to carry wrapping material, and means for casting said bobbin around said bead-reinforcing members.

2. In a machine for forming the body material of elastic tires, the combination with flexible means for operatively supporting and advancing bead-reinforcing members, of a rotary shuttle, a bobbin for wrapping material carried by said shuttle, and means for rotating said shuttle around said reinforcing members.

3. In a machine for forming the body material of elastic tires, the combination with flexible means for operatively supporting and advancing endless bead-reinforcing members, of a bobbin-bearing shuttle, and means for rotating said shuttle through and around said reinforcing members.

4. In a machine for forming the body material of elastic tires, the combination with flexible means for operatively supporting annular bead-reinforcing members, of a rotary bobbin-bearing shuttle, and means for rotating said bead supporting and shuttle members in linked relation.

5. In a machine for forming the body material of elastic tires, the combination with an endless belt for supporting and rotating annular bead-reinforcing members, of a shuttle arranged and adapted to rotate in an orbital path interlinked with that followed by the work-holding portion of said belt, a cord-carrying bobbin affixed to said shuttle, and means for driving said endless belt and shuttle at variable speeds.

6. In a machine for forming the body material of elastic tires, the combination with an endless belt arranged in the form of a double loop the ends of which are spaced apart for supporting and rotating annular bead reinforcing members, of a shuttle having a gap in its circumference arranged and adapted to rotate in an orbital path interlinked with that followed by the work-holding portion of said belt, a cord-carrying bobbin affixed to said shuttle, and means for driving said endless belt and shuttle at variable speeds.

7. In a machine for forming the body material of elastic tires, the combination with an endless belt having parallel edge grooves in its working surface for supporting and rotating annular bead-reinforcing members, of a shuttle arranged and adapted to rotate in an orbital path interlinked with that followed by the work-holding portion of said belt, a cord-carrying bobbin affixed to said shuttle, and means for driving said endless belt and shuttle at predetermined rates of speed.

8. In a machine for forming the body material of elastic tires, the combination with an endless belt for supporting and rotating annular bead-reinforcing members, of a series of guide rollers for directing the path of travel of said belt and spacing apart the looped upper ends thereof, sprocket chain and wheel connections common to all of said rolls whereby they are driven, a shuttle having a gap in its circumference and peripheral sprocket teeth arranged and adapted to rotate in an orbital path interlinked with that followed by the work-holding portion of said belt, a bobbin carried by said shuttle, a second endless sprocket chain constantly engaging a plurality of said shuttle teeth, and means for positively driving both of said chains.

9. In a machine for forming the body material of elastic tires, the combination with an endless belt for supporting in spaced relation and rotating annular bead-reinforcing members, of a series of power driven guide rollers for directing the path of travel of said belt and spacing apart the looped upper ends thereof, a pair of vertically adjustable idler rolls located in the extremities of said belt loops, a power driven shuttle having a gap in its circumference and peripheral sprocket teeth arranged and adapted to rotate in an orbital path interlinked with that followed by the work-holding portion of said belt, a bobbin carried by said shuttle, and means for positively driving said rotary parts.

10. In a machine for forming the body material of elastic tires, the combination with an endless work-holding belt arranged in the form of a double loop, of guide rollers for directing the path of travel of said belt, means for regulating the tension of said belt, a shuttle arranged and adapted to rotate in an orbital path interlinked with that followed by the work-holding portion of said belt, a cord-carrying bobbin affixed to and moving with said shuttle, and means for positively driving said work-holding belt and shuttle.

11. In a machine for forming the body material of elastic tires, the combination with an endless work-holding belt arranged in the form of a double loop, of guide-rollers for directing the path of travel of said belt, a pair of tension rolls over which said belt passes, means common to the last named rolls whereby they may be adjusted radially, a shuttle arranged and adapted to rotate in an orbital path interlinked with that followed by the work-holding portion of said belt, a cord-carrying bobbin affixed to and moving with said shuttle, and means common to said work-holding belt and shuttle whereby both are driven at predetermined rates of speed.

12. In a machine for forming the body material of elastic tires, the combination with means for operatively supporting and rotating annular bead rings of varying diameters, of a rotary shuttle, a cord-carrying bobbin attached to said shuttle, a raceway in which said shuttle is adapted to rotate, a vertical support upon which said raceway is adjustably mounted to provide for said bead rings of varying diameters, and means for driving said bead-ring-supporting and shuttle members in linked relation.

13. In a machine for forming the body material of elastic tires, the combination with a main supporting frame including parallel U-shaped members, guide rollers supported by and interposed between said frame members, an endless flexible belt guided by said rollers for supporting and rotating annular bead reinforcing members, a shuttle arranged and adapted to rotate in an orbital path interlinked with that followed by the work-holding portion of said belt, a cord-carrying bobbin affixed to said shuttle, and means for driving said endless belt and shuttle at predetermined rates of speed.

14. In a machine for forming the body material of elastic tires, the combination with a pedestal, of a double U-shaped frame rising from said pedestal, guide rollers supported by and interposed between the said frame members, an endless flexible belt guided by said rollers for supporting and rotating in parallel arrangement annular bead reinforcing members, a second supporting frame rising from said pedestal including a pair of parallel columns, a shuttle arranged and adapted to rotate in an orbital path interlinked with that followed by the work-holding portion of said belt, a cord-carrying bobbin attached to said shuttle, a raceway in which the shuttle aforesaid rotates, a raceway support adjustably mounted upon the parallel columns aforesaid, and means for driving said bead-ring-supporting and shuttle members in linked relation.

In testimony whereof I affix my signature, in presence of two subscribing witnesses.

ARCHER H. HARRIS.

Witnesses:
 THOMAS L. ROBINSON,
 E. C. DATSON.